(12) United States Patent
Krokstad (10) Patent No.: US 12,286,958 B2
(45) Date of Patent: Apr. 29, 2025

(54) OFF-SHORE WIND TURBINE SUPPORT SYSTEM, OFF-SHORE WIND FARM AND METHOD FOR CONTROLLING SUCH WIND FARM

(71) Applicant: GFMS AS, Trondheim (NO)

(72) Inventor: Jørgen Ranum Krokstad, Klæbu (NO)

(73) Assignee: GFMS AS, Trondheim (NO)

( * ) Notice: Subject to any disclaimer, the term of this patent is extended or adjusted under 35 U.S.C. 154(b) by 0 days.

(21) Appl. No.: 18/576,687

(22) PCT Filed: Jul. 5, 2022

(86) PCT No.: PCT/NO2022/050162
§ 371 (c)(1),
(2) Date: Jan. 4, 2024

(87) PCT Pub. No.: WO2023/282763
PCT Pub. Date: Jan. 12, 2023

(65) Prior Publication Data
US 2024/0309850 A1    Sep. 19, 2024

(30) Foreign Application Priority Data
Jul. 5, 2022   (NO) .................................... 20210865

(51) Int. Cl.
*F03D 13/25*        (2016.01)
*B63B 21/20*        (2006.01)
(Continued)

(52) U.S. Cl.
CPC ............ *F03D 13/256* (2023.08); *B63B 21/20* (2013.01); *B63B 21/26* (2013.01); *B63B 21/50* (2013.01);
(Continued)

(58) Field of Classification Search
CPC ....... F03D 13/256; B63B 21/50; B63B 22/04; B63B 22/02; B63B 22/18; B63B 2021/005; F05B 2240/93; F05B 2240/95
See application file for complete search history.

(56) References Cited

U.S. PATENT DOCUMENTS 7,489,046 B2 *   2/2009   Costin ................... F03B 17/061
                                                              290/43
11,486,362 B2 * 11/2022   Siegfriedsen ........... F03D 13/25
(Continued)

FOREIGN PATENT DOCUMENTS

CN        110949633 A      4/2020
EP        2 267 297 A2    12/2010
(Continued)

OTHER PUBLICATIONS

Carrascosa, "Swinging Around Twin Hull", Saitec engineering, SATH, 2016, total 54 pages.
(Continued)

*Primary Examiner* — Eldon T Brockman
(74) *Attorney, Agent, or Firm* — Birch, Stewart, Kolasch & Birch, LLP (57) ABSTRACT

A wind turbine support system configured to support an off-shore wind turbine, an offshore wind turbine farm and a method for controlling a floating offshore wind park with such turbine support system are described. The wind turbine support system includes: a floating body configured to hold a lower end of a tower of the wind turbine; and a single point mooring system. The single point mooring system includes a seabed anchor; and a mooring line configured to be connected to the seabed anchor at a first end thereof. The floating body has a bow and a stern, and the bow is configured to be connected to a second end of the mooring line.

20 Claims, 6 Drawing Sheets

(51) Int. Cl.
*B63B 21/26* (2006.01)
*B63B 21/50* (2006.01)
*B63B 35/44* (2006.01)
*B63B 39/00* (2006.01)
*B63B 79/15* (2020.01)
*F03D 7/02* (2006.01)
*F03D 7/04* (2006.01)
*F03D 13/20* (2016.01)

(52) U.S. Cl.
CPC .............. *B63B 35/44* (2013.01); *B63B 39/00* (2013.01); *B63B 79/15* (2020.01); *F03D 7/0204* (2013.01); *F03D 7/049* (2023.08); *F03D 13/201* (2023.08); *B63B 2021/203* (2013.01); *B63B 2035/446* (2013.01); *F05B 2240/93* (2013.01); *F05B 2240/95* (2013.01); *F05B 2270/321* (2013.01)

(56) References Cited

U.S. PATENT DOCUMENTS

| | | | | |
|---|---|---|---|---|
| 2014/0037447 A1* | 2/2014 | Attia | ............ | F03D 7/0204 416/9 |
| 2014/0044541 A1* | 2/2014 | Dupin De La Gueriviere | ............ | F03D 17/00 416/85 |
| 2014/0060411 A1* | 3/2014 | Choisnet | ............ | B63B 39/00 114/122 |
| 2016/0177927 A1 | 6/2016 | Saeki et al. | | |
| 2016/0245261 A1* | 8/2016 | Cruse | ............ | F03D 13/25 |
| 2019/0176939 A1* | 6/2019 | Tayouri | ............ | B63B 1/107 |

FOREIGN PATENT DOCUMENTS

| | | |
|---|---|---|
| EP | 2 807 373 A1 | 12/2014 |
| EP | 3 783 221 A1 | 2/2021 |
| WO | WO 03/004869 A1 | 1/2003 |
| WO | WO 2005/021961 A1 | 3/2005 |
| WO | WO 2013/110276 A1 | 8/2013 |
| WO | WO 2019/143283 A1 | 7/2019 |
| WO | WO 2021/240132 A1 | 12/2021 |

OTHER PUBLICATIONS

International Search Report for PCT/NO2022/050162 mailed on Dec. 22, 2022.

Norwegian Search Report, issued in NO Application No. 20210865 dated Feb. 4, 2022.

Tore Stensvold, "Ingen har funnet gangbar teknologi for vindturbiner på 40-100 meters dyp. Dette kan være løsningen", Teknisk Ukeblad, Oct. 6, 2017, total 11 pages, URL: "https://www.tu.no/artikler/ingen-har-funnet-gangbar-teknologi-for-vindturbiner-pa-40-100-meters-dyp-dette-kan-vaere-losningen/408930".

Written Opinion of the International Searching Authority for PCT/NO2022/050162 mailed on Dec. 22, 2022.

* cited by examiner

OFF-SHORE WIND TURBINE SUPPORT SYSTEM, OFF-SHORE WIND FARM AND METHOD FOR CONTROLLING SUCH WIND FARM

TECHNICAL FIELD

The present invention relates to offshore wind turbines, and more specifically to support and foundation of wind turbines. This invention relates to floating foundations for wind turbines and methods for controlling such floating foundations.

BACKGROUND

Commercial, land-based wind turbines for production of electric power is an important source of renewable energy. In general, the turbine axle is mounted pivotally on top of a fixed tower and can be upwind or downwind. Most of the turbines are upwind due to the smaller wind shade on the front of the turbine tower. For upwind turbines a yaw-control system is required to keep the turbine facing the incoming wind during energy production. A large majority of todays commercial wind turbines are upwind, three-bladed Horizontal-Axis Wind Turbines (HAWT).

Until recently, the costs for harvesting off-shore wind energy have been high compared to on-shore production. However, with the introduction of larger turbines, investment costs can be reduced since installation costs for both the turbine and the grid can be decreased.

Other factors are also contributing to the initial success of offshore wind. Very often, the wind conditions are more favourable than for onshore locations. Further, deployment of larger and larger wind turbines is not always possible or desirable onshore due to visual and audible drawbacks, as well as an undesirable environmental footprint and blade transport limitations.

To share infrastructure costs between turbines and limit environmental impact, offshore wind turbines are mostly arranged in farms. In such farms, some of the wind turbines will usually be downwind from other turbines. This may result in significant reduction of wind speed, which again lead to a reduction in the power produced. This reduction is often termed wake losses. The affected turbines and the wake losses will be a function of the incoming wind direction, wind strength and number of rotor diameter distances down-wind or cross-wind between the turbines.

In general, there are two main types of wind power foundations in use for off-shore wind. Most of the wind farms are deployed in shallow water, allowing a fixed foundation similar in structure to the foundations used onshore. For deeper water depths, a number of solutions for wind turbines with submerged floating foundations have been introduced. The most economically challenging water depths are water depths sufficiently deep for bottom fixed foundations –40 to 70 meters, and water depths sufficiently shallow for floating wind turbines –100 to 40 meters.

WO03004869 A1 discloses a wind turbine arranged on a tower fixed to a submerged buoyancy body secured to the bottom by chains, wires, ropes etc.

WO2005021961 A1 discloses an offshore wind turbine with a submerged, anchored floating foundation that is free to move in the vertical direction. As a consequence of the effect of the waves on the float, the motion of the wind turbine will act as a damping mechanism on the motion and thus extract energy from the waves.

US20160177927 A1 discloses a somewhat similar wind turbine and foundation with a downwind machine.

US2016245261A1 discloses a floating offshore wind turbine plant with a downwind machine and single-line mooring.

SHORT SUMMARY

An improved wind turbine support system, an offshore wind turbine farm, and a method for controlling a floating offshore wind farm are specified in the independent claims.

The wind turbine support system may have one or more of the advantages listed below over prior art.

One of the main challenges with prior art technology is to longitudinally stabilize a floating wind turbine of an upwind type arranged on a floating body connected to the seabed via single line mooring. Instabilities tend to occur at higher wind speeds and especially when wind speed increases above cut-out speed and the wind turbine enters passive mode, where the blades are pitched to feather.

The invention as defined in the claims, increases weather waning stability at higher wind speeds.

Reduced overall costs for floating energy production. The total manufacturing costs as well as installation costs may be reduced, especially for intermediate water depths of 40 to 100 meters Support for industry standard wind turbines, i.e., upwind HAWT.

Reduced wake losses in wind parks, allowing reduced spacing between wind turbines and improved energy production for a given area.

Increased yield for comparable wind turbines. I.e., a wind turbine combined with the wind turbine support system according to the invention may obtain a higher energy production than the same turbine would have in a prior art installation given that the operating conditions are identical.

Reduction of load from waves and current on the wind turbine support system.

Environmentally friendly, with little impact on the seabed. Recent reports have stated that the sea-bed and marine biology is more vulnerable to human activities than previously suggested. Far field scour and disruption of sandeel and fishing activities is avoided.

A number of embodiments of the invention are defined in the dependent claims and in the description.

BRIEF DESCRIPTION OF THE DRAWINGS

FIG. 3a illustrate in a side view a wind turbine support system (1) according to an embodiment of the invention. The wind turbine support system here comprises an electric cable (61) configured to run between the floating body (2) and the seabed anchor, wherein the electric cable (61) is attached to the mooring system (3) between the bow (21) and the seabed anchor (4). In addition to the first floaters attached to the mooring line, one or more sets of second floaters are distributed along parts of the electric cable. The cable terminates in the bow (21) and runs through the floating body (2) and its transition piece and tower support system (5), before terminating in a termination point (63) in the lower end of the tower above the water line.

FIG. 3b illustrates a detail of FIG. 3a.

In the lower row we see that the second wind turbine escapes the wake from the left turbine by a combination of yaw control and weather waning that is made possible by the current invention.

upper right-hand turbine will be in the wake of the upper left-hand turbine. However, by slightly turning the turbine to the right sideways by yaw control, the wind turbine support system will weather-wane out of the wake, and improved energy production can be achieved. In addition, or alternatively, the turbine to the left may be rotated by similar means to move the wake away from the wind turbine to the right.

EMBODIMENTS OF THE INVENTION

In the following description, various examples and embodiments of the invention are set forth in order to provide the skilled person with a more thorough understanding of the invention. The specific details described in the context of the various embodiments and with reference to the attached drawings are not intended to be construed as limitations. Rather, the scope of the invention is defined in the appended claims.

The embodiments described below are numbered. In addition, dependent embodiments defined in relation to the numbered embodiments are described. Unless otherwise specified, any embodiment that can be combined with one or more numbered embodiments may also be combined directly with any of the dependent embodiments of the numbered embodiment(s) referred to.

In a first independent embodiment EM1, the invention is a wind turbine support system (1) configured to support an upwind off-shore wind turbine (100) arranged on a tower (101); wherein the wind turbine support system comprises;
a floating body (2) configured to hold a lower end of a tower of the wind turbine;
a single line mooring system (3) comprising;
a seabed anchor (4), and
a mooring line (31) configured to be connected to the seabed anchor in a first end (31a), wherein the floating body (2) has a bow (21) and a stern (22), wherein the bow is configured to be connected to a second end (31b) of the mooring line, wherein a horizontal plane the wind turbine support system is configured to have a System Center of Gravity (SCG) arranged in front of a Hub Center of Gravity (HCG), wherein the Hub Center of Gravity (HCG) is arranged in the center of the turbine hub, and the System Center of Gravity (SCG) is the center of gravity for the wind turbine support system (1) comprising the wind turbine (100) and the tower that the wind turbine support system is configured to carry.

One of the main challenges with prior art technology is to longitudinally stabilize a floating wind turbine of an upwind type arranged on a floating body connected to the seabed via single line mooring. Although instabilities may be negligible for prior art systems at lower speeds, simulations have shown that they increase dramatically at higher wind speeds and especially when wind speed increases above cut-out speed where the wind turbine enters passive mode, and where the blades are pitched to feather.

The relative arrangement of the System Center of Gravity (SCG) and the Hub Center of Gravity (HCG) has the effect that it increases weather waning stability, especially at wind speeds above cut-out speed.

The Hub Center of Gravity (HCG) is sometimes defined as the Hub center of mass and is located in the center of the turbine hub of the wind turbine (100). This is where imaginary lines through the turbine blades in the horizontal direction would intersect.

The System Center of Gravity (SCG) is the center of gravity for the wind turbine support system (1) including the fully equipped wind turbine (100) and the tower that the wind turbine support system is configured to carry.

In a dependent embodiment the floating body (2) is arranged below the System Center of Gravity (SCG).

In a first dependent embodiment, the System Center of Gravity (SCG) is configured to be arranged in front of the Hub Center of Gravity (HCG) when the wind turbine (100) operates in passive mode.

The unconventional relative location of the centers of gravity requires movement of the aerodynamic center of the wind turbine backwards. This in turn requires re-design of the floating body (2) as described in the embodiments below to ensure that the floating body remains stable about its principal axis under all rated environmental conditions.

In a second dependent embodiment, that may be combined with the first dependent embodiment, a horizontal cross section, the floating body is configured to weather wane with its longitudinal direction in line with a radius extending from the anchor when in operation.

In a third dependent embodiment, that may be combined with the first or second dependent embodiment, the wind turbine support system (1) comprises a tower support system (5), configured to hold the lower end of the wind turbine, wherein the tower support system is arranged on a rear third of the floating body.

In a second independent embodiment EM2, that may be combined with EM1, wherein the floating body (2) comprises a hull and a deck, wherein the deck is sealed to the hull, and the height of the deck is decreasing from the tower support system in all directions towards the outer edge of the hull.

In a first dependent embodiment, the wind turbine support system (1) comprises a skirt (23) or keel, extending outwardly from the lower portion of the hull.

In a second dependent embodiment, that may be combined with the first dependent embodiment, wherein any of the surfaces of the deck and the hull are made of flat plates.

In a third dependent embodiment, that may be combined with the first or second dependent embodiments, at least 30% of the volume of the floating body is above a water line (WL) when it is loaded with the wind turbine (100) and the tower (101).

In a fourth dependent embodiment, that may be combined with any of the first to third dependent embodiments, the floating body has a hull shape with a centerline (CL), wherein a rear section of the ship has a width of 30% to 60% or 40% to 50% of the length of the centerline.

In a fifth dependent embodiment, that may be combined with any of the first to fourth dependent embodiments, the floating body has the shape of an isoceles trapezium where the bow and the stern are parallel sides of the trapezium and the floating body has a tapered shape between the bow and the stern.

In a sixth dependent embodiment, that may be combined with any of the first to fifth dependent embodiments, the upper part of the centerline constitutes a straight edge running from the bow to the tower support system.

In a seventh dependent embodiment, that may be combined with any of the first to sixth dependent embodiments, the stern has a width of 30% to 50% or 35% to 45% of the length of a turbine blade of the wind turbine (100) that the wind turbine support system (1) is configured to carry.

In an eight dependent embodiment, that may be combined with any of the first to seventh dependent embodiments, the floating body (2) comprises a docking area (34) in the stern. The docking area can be configured as a recess into the stern.

In a fourth independent embodiment EM4, that may be combined with any of EM1 to EM3, the wind turbine support system (1) comprises an electric cable (61) configured to run between the floating body (2) and the seabed anchor, wherein the electric cable (61) is attached to the mooring system (3) between the bow (21) and the seabed anchor (4).

In a first dependent embodiment, the electric cable (61) is arranged inside at least a section of the mooring line (31).

In a second dependent embodiment, that may be combined with the first dependent embodiment, the wind turbine support system (1) comprises buoyancy elements attached to the electric cable.

In a third dependent embodiment, that may be combined with the first or second dependent embodiments, the seabed anchor (4) comprises a submerged electric swivel, and wherein the electric cable (61) is terminated in the electric swivel (4).

Figure 1:
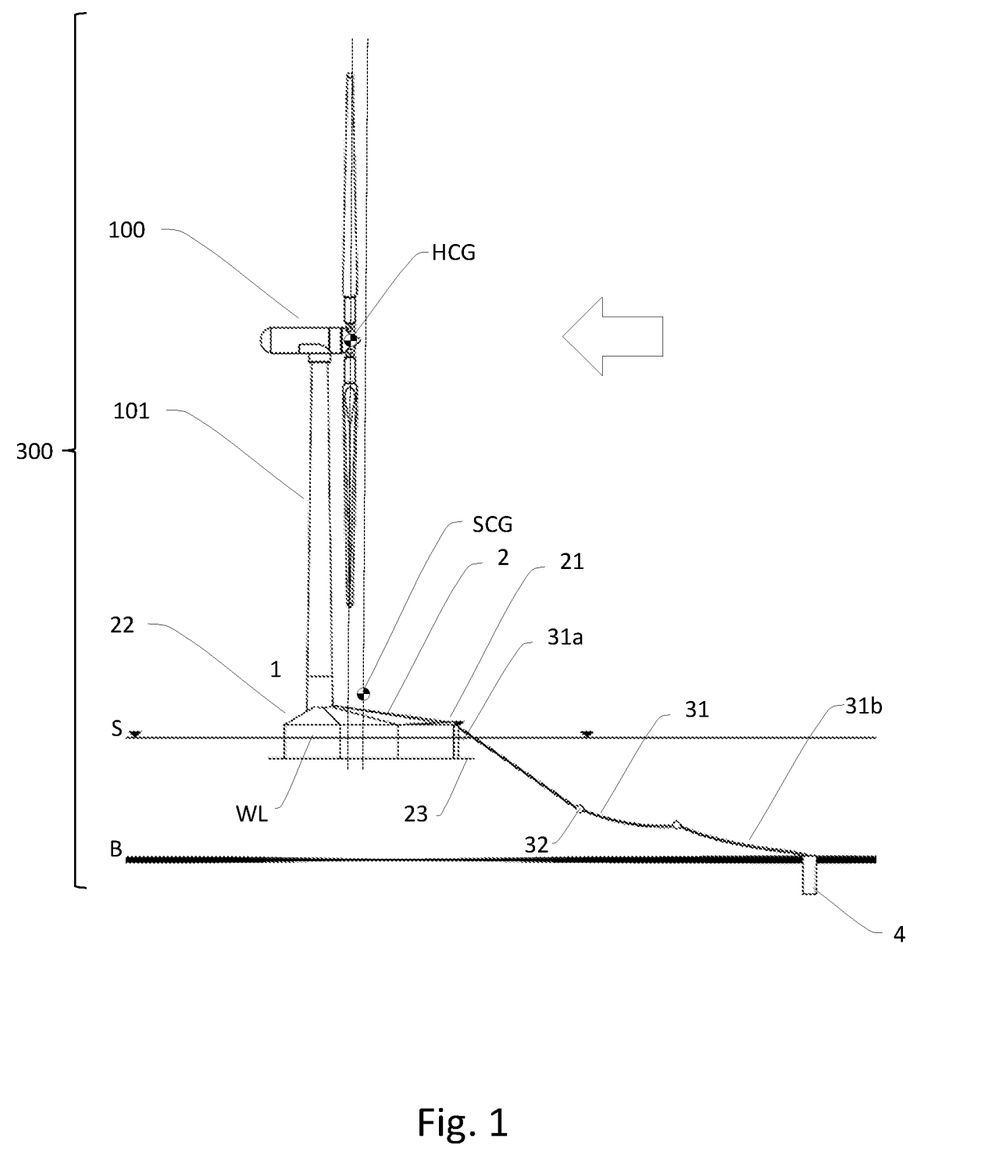
FIG. 1 illustrates in a side view a wind turbine support system (1) according to an embodiment of the invention. The arrow indicates incoming wind for an upwind wind turbine (100) supported by the wind turbine support system. Sea surface (S) and seabed (B) are indicated as two substantially horizontal lines. The bow (21) of the floating body (2) is connected to a seabed anchor (4) via a single point mooring line (31). First floaters (32) are separately arranged along the mooring line (31). The Hub Center of Gravity (HCG) can be seen arranged aftwards the System Center of Gravity (SCG), where the System Center of Gravity (SCG) comprises the mass of the tower and the turbine in addition to the wind turbine support system (1) and is in this embodiment located above the floating body (2).
Figure 2:
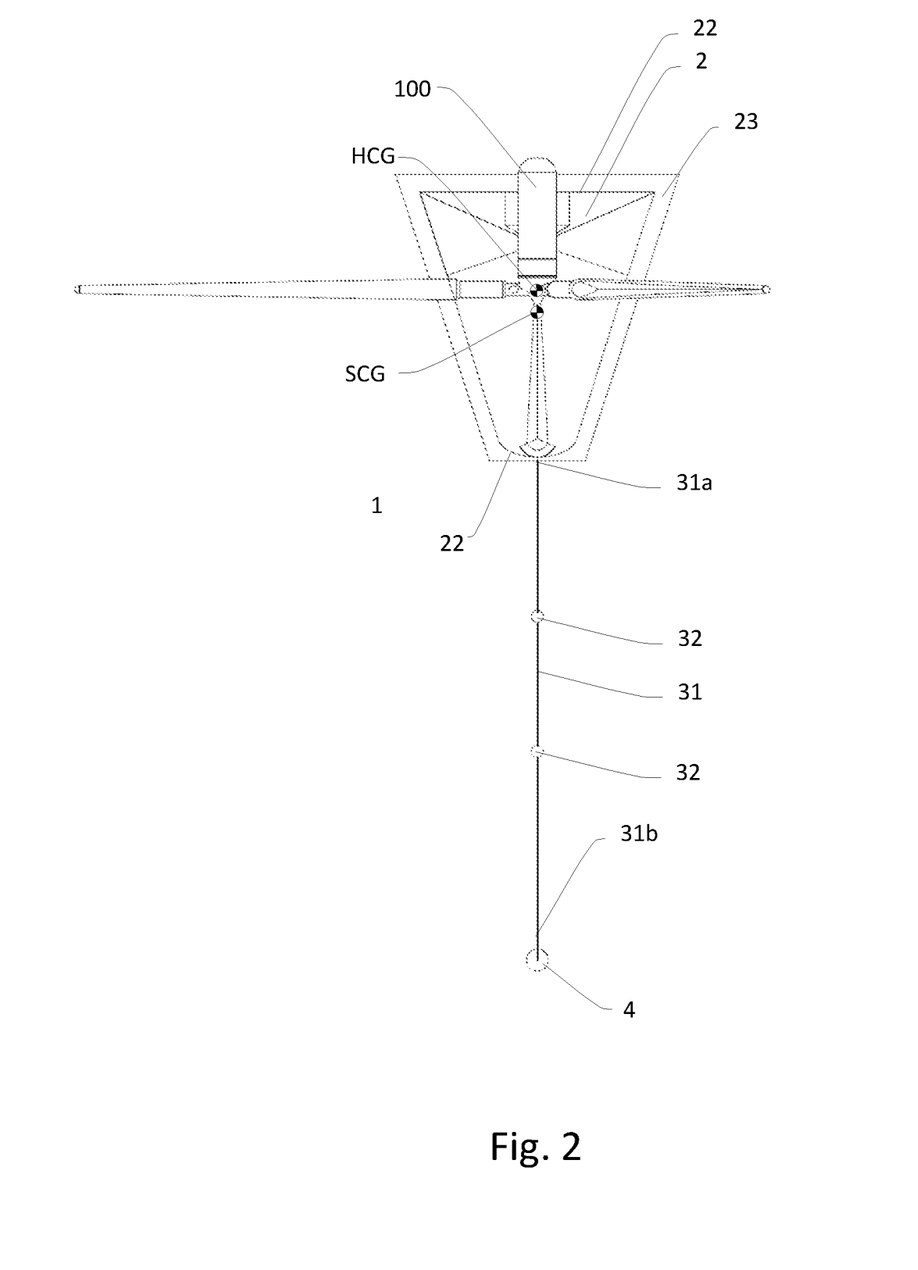
FIG. 2 illustrates in a top view a wind turbine support system, with similar references as in FIG. 1.
Figure 3A:
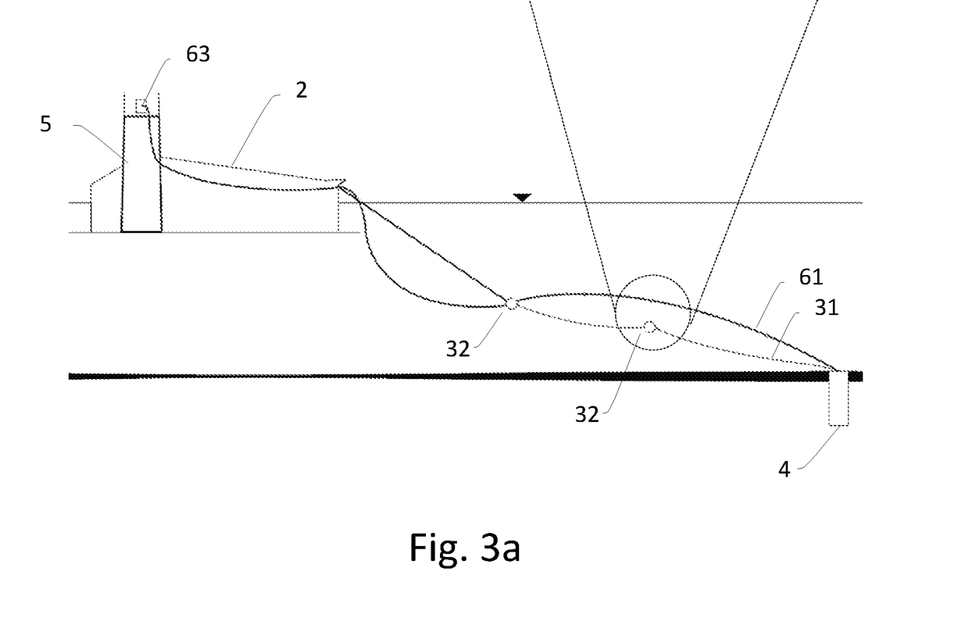
Figure 3B:
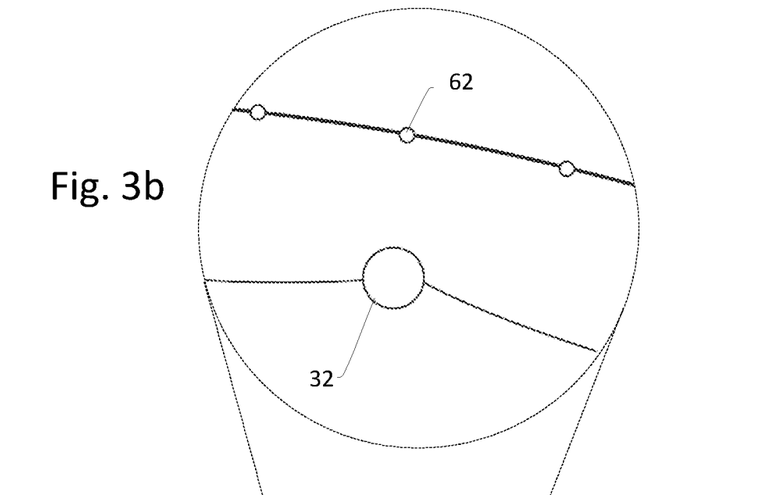
Figure 4A:
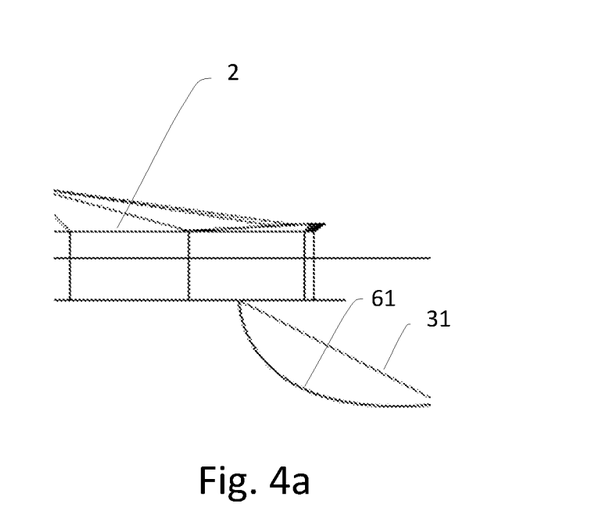
FIGS. 4a and 4b illustrate alternative positions for termination of the mooring line and the electric cable in the bow section.
Figure 4B:
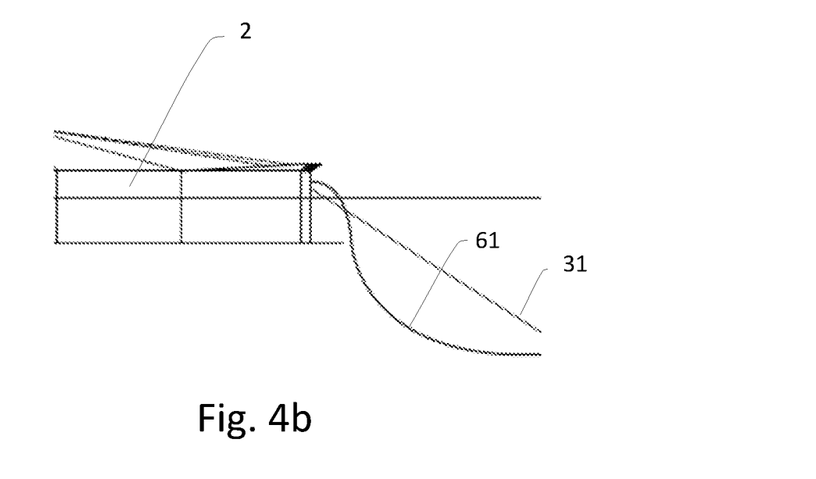
Figure 5A:
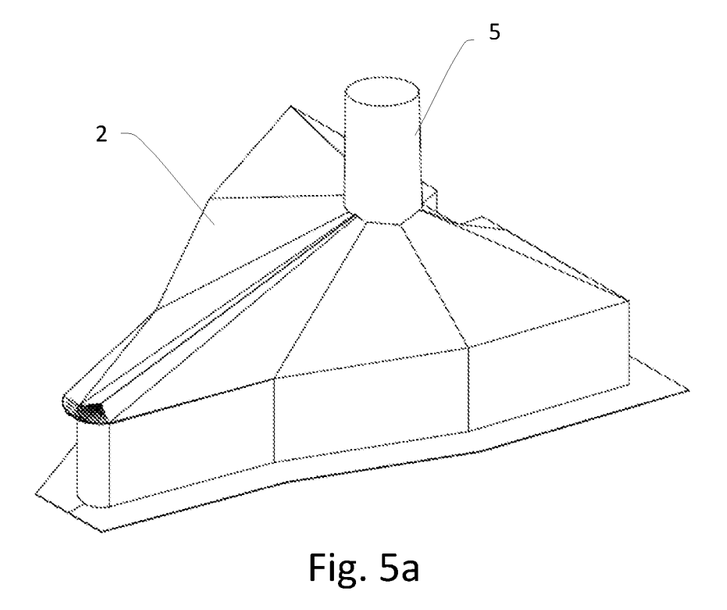
FIGS. 5a and 5b illustrate in different perspective views two embodiments of a wind turbine support system (1), comprising a docking area for e.g. a maintenance vessel in two different locations as an alcove in the stern of the floating body. Note that the docking area will always be leeward, due to the weathervaning effect.
Figure 5B:
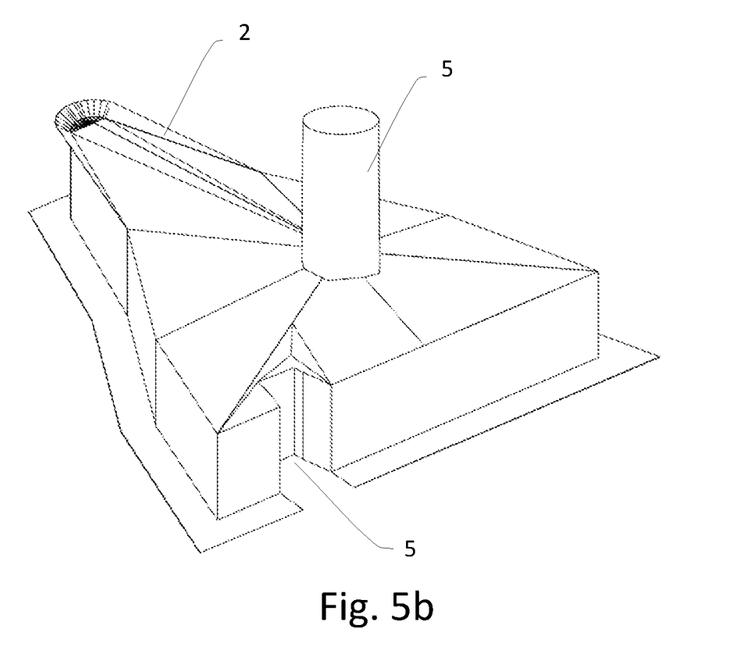
Figure 6:
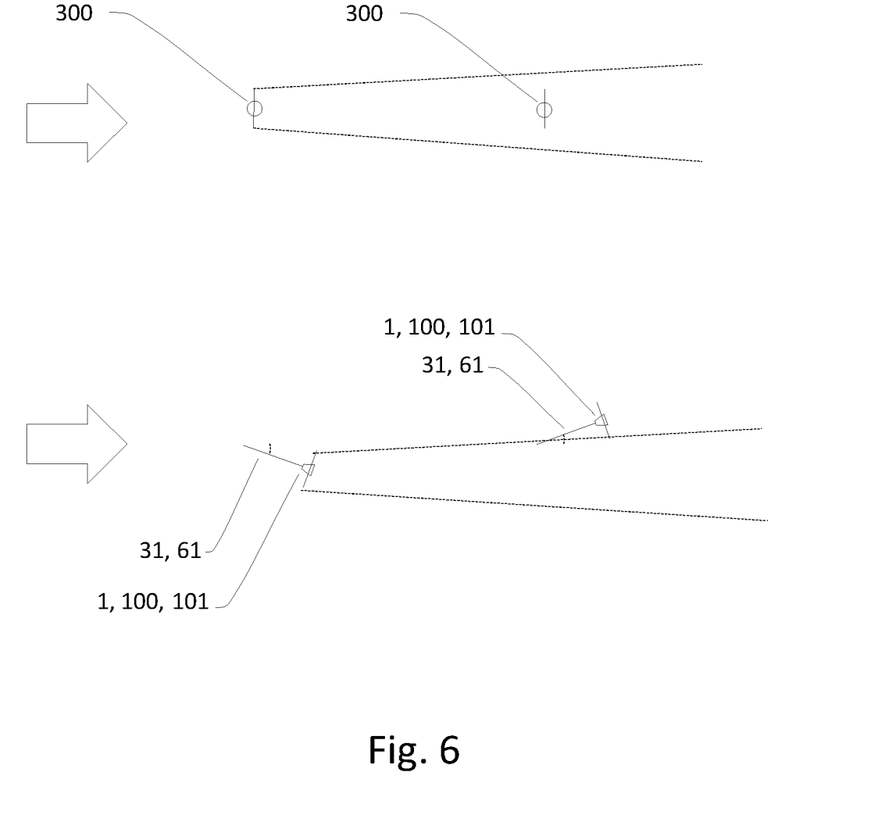
FIG. 6 is a simplified schematic illustration of a wind turbine park. Here the upper two wind turbines (300) may represent prior art floating wind turbines or wind turbines with fixed foundations. The lower wind turbines represent wind turbine support systems (1) according to the invention where each of the systems are carrying a tower and a wind turbine. In the prior art example in the upper row, the right-hand wind turbine will be in the wake of the left wind turbine with the indicated wind direction. The wake is represented by dotted lines.

In an independent embodiment, the invention is an offshore wind turbine system (300) comprising the wind turbine support system (1) and the upwind off-shore wind turbine (100) arranged on a tower (101) according to any of the embodiments above, and as illustrated in FIG. 1.

The floating wind turbine system (300) may be used as a stand-alone wind turbine installation, but further advantages can be exploited when several such systems are installed in an offshore wind farm. Wind turbines in a wind farm are typically installed in an array-geometry configuration, where wind turbines are arranged in rows and columns. Spacing depends on the size of the turbines and local environmental as well as regulatory constraints. However, one of the main design criteria is the wake recovery distance, since wind turbines in the wake(s) of other wind turbines will generate less power than they would be able to if they were not in the wake. In wind parks with stationary wind turbines, a typical distance would be 7 to 10 times the diameter of the rotor. I.e., for a state of the art 15 MW turbine the distance would be around two kilometres. Thus, a wind farm with such turbines will have a large environmental footprint, both above and below the sea-level. More specifically, long power cables from each of the wind turbines for interconnecting with one or more off-shore grid collection buses will be costly. In addition, the losses in the cables will be a function of distance, and these power losses should also be taken into account.

According to an embodiment of the invention the separation distance between wind turbines may be reduced by applying the floating wind turbine system (300) with the currently disclosed wind turbine support system (1) in the wind farm. In addition to the effects of reduced distance obtained during power production, the increased stability at higher wind speeds of the individual floating wind turbine systems (300) in a wind park may have a positive effect on the stability of other wind turbines in the same wind park. E.g. the instability of a first upwind turbine may negatively affect another turbine that may alternately be inside and outside the wake of the first turbine, since the wake moves due to the instability of the first turbine.

In an independent embodiment ES1 the invention is an offshore wind turbine farm (200) comprising first and a second offshore wind turbine system (300). In this embodiment the stability of the individual wind turbine systems (300) may be improved. This may in turn reduce space requirements and increase efficiency for the wind park.

In a dependent embodiment, the wind turbines (100) comprises respective yaw control systems, wherein the offshore wind turbine farm (100) further comprises a wake control system in communication with the yaw control systems, wherein the wake control system is configured for;
  detecting an incoming wind direction on one or more of the wind turbines,
  determining a wake of the first wind turbine,
  position any of the first and second wind turbine support systems by adjusting the yaw of any of the first and second yaw system to keep the second wind turbine out of the wake of the first wind turbine.

The invention is also in an independent embodiment EC1 a method for controlling a floating offshore wind farm (200), comprising first and second wind turbines arranged on a tower, each supported by a wind support system according to any of the embodiments EM1 to EM4, and wherein the first and second wind turbines comprise a first and second yaw system, respectively, wherein the method comprises;
  detecting the incoming wind direction on one or more of the wind turbines,
  determining the wake of the first wind turbine,
  positioning any of the first and second wind turbine support system by adjusting the yaw of any of the first and second yaw system to keep the second wind turbine out of the wake of the first wind turbine.

Thus, by continuously reducing the wake losses, the individual distances between the wind turbines can be reduced. This will also reduce the total geographical coverage of the park and/or improve the amount of energy generated from the park under similar operating conditions. Energy gain can mainly be related to reduced wake losses, but reduced losses from shorter cables will also contribute to the overall improved energy output.

Determination of the wake could include any of; wake direction, wake distribution, i.e. wind strength as a function of distance from the turbine causing the wake, energy distribution, i.e. wind energy as a function of distance from the turbine causing the wake, etc.

In the exemplary embodiments, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As those with skill in the art will readily understand, embodiments that incorporate any subset of features described herein and that are not expressly interdependent have been contemplated by the inventor and are part of the intended disclosure. However, explicit description of all such embodiments would not contribute to the understanding of the principles of the invention, and consequently some permutations of features have been omitted for the sake of simplicity or brevity.

The invention claimed is:

1. A wind turbine support system configured to support an upwind off-shore wind turbine arranged on a tower, wherein the wind turbine support system comprises:
    a floating body configured to hold a lower end of the tower of the wind turbine;
    a single line mooring system, the single line mooring system comprising:
        a seabed anchor; and
        a mooring line configured to be connected to the seabed anchor at a first end thereof; and
    a tower support system configured to hold a lower end of the wind turbine, wherein the tower support system is arranged on a rear third of the floating body,
    wherein the floating body has a bow and a stern,
    wherein the bow is configured to be connected to a second end of the mooring line,
    wherein the wind turbine support system is configured to have a System Center of Gravity (SCG) arranged in front of a Hub Center of Gravity (HCG),
    wherein the Hub Center of Gravity (HCG) is arranged in a center of a turbine hub of the wind turbine, and the System Center of Gravity (SCG) is a center of gravity for the wind turbine support system including the wind turbine and the tower that the wind turbine support system is configured to carry, and
    wherein the floating body comprises a hull and a deck, wherein the deck is sealed to the hull, and a height of the deck is decreasing from the tower support system in all directions towards the outer edge of the hull.

2. The wind turbine support system of claim 1, wherein the System Center of Gravity (SCG) is configured to be arranged in front of the Hub Center of Gravity (HCG) when the wind turbine operates in passive mode.

3. The wind turbine support system of claim 2, wherein a horizontal cross section, the floating body is configured to weather wane with a longitudinal direction thereof in line with a radius extending from the anchor when in operation.

4. The wind turbine support system of claim 1, wherein the wind turbine support system comprises a skirt or keel, extending outwardly from a lower portion of the hull.

5. The wind turbine support system of claim 1, wherein any of the surfaces of the deck and the hull are made of flat plates.

6. The wind turbine support system of claim 1, wherein at least 30% of the volume of the floating body is above a water line (WL) when floating body is loaded with the wind turbine and the tower.

7. The wind turbine support system of claim 1, wherein the floating body has a hull shape with a centerline (CL), wherein a rear section of the ship has a width of 30% to 60% of a length of the centerline.

8. The wind turbine support system of claim 1, wherein the floating body has the shape of an isosceles trapezium where the bow and the stern are parallel sides of the trapezium and the floating body has a tapered shape between the bow and the stern.

9. The wind turbine support system of claim 7, wherein an upper part of the centerline constitutes a straight edge running from the bow to the tower support system.

10. The wind turbine support system of claim 1, wherein the stern has a width of 30% to 50% of a length of a turbine blade of the wind turbine that the wind turbine support system is configured to carry.

11. The wind turbine support system of claim 1, wherein the floating body comprises a docking area in the stern, and wherein the docking area is configured as a recess into the stern.

12. The wind turbine support system of claim 1, comprising an electric cable configured to run between the floating body and the seabed anchor, wherein the electric cable is attached to the mooring system between the bow and the seabed anchor, and wherein the electric cable is arranged inside at least a section of the mooring line.

13. The wind turbine support system of claim 12, wherein the wind turbine support system comprises buoyancy elements attached to the electric cable.

14. The wind turbine support system of claim 12, wherein the seabed anchor comprises an electric swivel, and wherein the electric cable is terminated in the electric swivel.

15. The wind turbine support system of claim 1, wherein the floating body has a hull shape with a centerline (CL), wherein a rear section of the ship has a width of 40% to 50% of a length of the centerline.

16. The wind turbine support system of claim 1, wherein the stern has a width of 35% to 45% of a length of a turbine blade of the wind turbine that the wind turbine support system is configured to carry.

17. An offshore wind turbine system comprising the wind turbine support system and the upwind off-shore wind turbine arranged on a tower according to claim 1.

18. An offshore wind turbine farm comprising first and second offshore wind turbine systems according to claim 17.

19. The offshore wind turbine farm of claim 18, wherein the first and second wind turbines comprise first and second yaw control systems, wherein the offshore wind turbine farm further comprises a wake control system in communication with the yaw control systems, wherein the wake control system is configured to:
    detect the incoming wind direction on one or more of the wind turbines;
    determine the wake of the first wind turbine; and
    position any of the first and second wind turbine support systems by adjusting the yaw of any of the first and second yaw control systems to keep the second wind turbine out of the wake of the first wind turbine.

20. A method for controlling the floating offshore wind farm of claim 18, wherein the first and second wind turbines comprise first and second yaw control systems, respectively, wherein the method comprises:

detecting the incoming wind direction on one or more of the wind turbines;
determining the wake of the first wind turbine; and
positioning any of the first and second wind turbine support systems by adjusting the yaw of any of the first and second yaw control systems to keep the second wind turbine out of the wake of the first wind turbine.

* * * * *